United States Patent Office 2,943,094
Patented June 28, 1960

2,943,094
CATALYTIC CONVERSION PROCESS

Stanley Francis Birch and Peter Desmond Holmes, Sunbury-on-Thames, England, assignors to The British Petroleum Company Limited, London, England, a British joint-stock corporation No Drawing. Filed Mar. 25, 1958, Ser. No. 723,643
Claims priority, application Great Britain Apr. 5, 1957
12 Claims. (Cl. 260—329)

This invention relates to a process of catalytic conversion.

Catalysts have been described in which an alumina sol is mixed with a solution of hydrofluoric acid and the resulting gel is dried at room temperature and then heated to 900°–1100° F. The catalyst so prepared is stated to be suitable for converting hydrocarbons, for example, in the cracking of gas oil to form gasoline at temperatures up to 510° C.

Activated catalysts have been described wherein an alumina catalyst is treated with hydrogen fluoride in vapour phase and it has been stated that these catalysts are suitable for the removal of alkyl groups from alkyl substituted aromatics.

There has also been described a process for the separation of thiophene from aromatic hydrocarbons by selectively alkylating the thiophene under conditions such that the aromatic hydrocarbons are unaltered, the thiophene alkylate being subsequently separated by distillation. According to this process, the alkylation is carried out in liquid phase, and the process as described employs catalysts suitable for use in liquid phase.

It is an object of this invention to provide a novel process for the catalytic conversion of thiophenes. It is a further object to provide a process for the conversion of thiophenes using a solid catalyst. It is a further object to provide a process for the conversion of thiophenes to aromatic hydrocarbons. It is a further object to provide a process for the conversion of alkyl thiophenes to thiophenes of different boiling point. It is a further object to provide a process for the removal of thiophenes from mixtures consisting predominately of aromatic hydrocarbons. Other objects will appear hereinafter.

According to the present invention there is provided a process for the conversion of a heterocyclic compound having at least one nucleus containing only carbon atoms and at least one sulphur atom and having at least one aliphatic group attached to said nucleus, wherein said compound is passed at elevated temperature in contact with a catalyst, being a catalyst produced by impregnation of alumina with hydrofluoric acid in aqueous solution, said alumina being in catalytically active form or in a form capable, after impregnation, of conversion to catalytically active form and, after impregnation, being so converted.

Preferably the heterocyclic compound contains a thiophene nucleus. Preferably said compound is an alkyl thiophene. Suitably the alkyl group or groups have 1–4 carbon atoms/molecule. Typical compounds which may be reacted are 2-methyl thiophene, 3-methyl thiophene, 2:5-dimethyl thiophene and 2:3:5-trimethyl thiophene.

The reaction may suitably be carried out in the presence of hydrogen.

The process of this invention may be carried out to effect the following reactions:

(1) Dealkylation of alkyl thiophenes to form lower alkyl thiophenes and/or unsubstituted thiophene.

(2) Simultaneous dealkylation and alkylation of alkyl thiophenes.

(3) Conversion of alkyl thiophenes to aromatic hydrocarbons.

The extent to which these reactions take place simultaneously will depend on the chemical formula of the compound reacted and upon the reaction conditions. Thus conditions may be employed under which (a) 2-methyl thiophene undergoes a substantial conversion to thiophene with very little production of aromatics or, on the other hand, (b) 2:3:5-trimethyl thiophene undergoes a substantial conversion to toluene with relatively low conversion to lower alkyl thiophenes. Typical conditions for carrying out reactions (a) and (b) are:

|  | (a) | (b) |
|---|---|---|
| Temperature | 556° C | 553° C. |
| Pressure | Atmospheric | Atmospheric. |
| Space Velocity | 0.70 | 0.50. |
| Hydrogen/Hydrocarbon Mol Ratio | 3.4 | 4.5. |

Usually, under the conditions employed, aliphatic components will be cracked to form light gases.

The process of the invention may be employed for the conversion of fractions containing a mixture of hydrocarbons and heterocyclic compounds as defined above, and is particularly valuable for the conversion of "aromatic extracts" obtained by the solvent extraction of distillation fractions of petroleum origin. Furthermore, it is conventional practice to wash aromatic extracts with sulphuric acid whereby an acid tar is recovered as by-product. According to a further feature of this invention, the acid tar is diluted with water to form two phases and the non-aqueous phase, which contains thiophenic and aromatic compounds, is used as a feedstock in the process hereinbefore described. A particularly suitable material for use as feedstock is kerosine extract tar oil and fractions derived therefrom.

"Aromatic extracts" usually contain a mixture of aromatic hydrocarbons and organic sulphur compounds which are difficult to separate by fractional distillation because of the extensive formation of azeotropes. By the process of this invention, a substantial proportion of the sulphur compounds may be converted to compounds having a boiling point such that azeotrope formation does not take place. Clearly, where subsequent separation by distillation is intended, it is advantageous to subject a narrow boiling fraction, preferably boiling over a range of not more than 20° C., to the reaction according to this invention.

When the product consists primarily of thiophene and benzene the mixture may be separated by methods well known in the art for the purification of coal tar benzole.

Thus according to a further feature of this invention, a sulphur-containing extract, obtained by the solvent extraction of a distillation fraction of petroleum origin, said extract having a narrow boiling range preferably not greater than 20° C., is passed in vapour phase and at elevated temperature, in contact with a catalyst, being a catalyst produced by impregnation of alumina with hydrofluoric acid in aqueous solution, said alumina being in catalytically active form or in a form capable, after impregnation, of conversion to catalytically active form and, after impregnation, being so converted, and thereafter the product fractionally distilled to separate a fraction enhanced in concentration of organic sulphur compounds from a fraction enhanced in concentration of aromatic hydrocarbons.

According to a further feature of this invention, a sulphur-containing extract, obtained by solvent extraction of a distillation fraction of the petroleum origin, with or without further extraction by acid washing, is passed at elevated temperature over that catalyst hereinbefore described, the product fractionally distilled and benzene and thiophene recovered, higher boiling material being recycled to the catalytic conversion stage.

Usually the feedstock to the process of this invention will be employed in vapour phase.

Preferably the alumina is impregnated with sufficient hydrofluoric acid to give 1% to 25% by weight of fluorine, estimated in elemental form, on the active catalyst.

Preferably when the process is operated at atmospheric pressure the catalyst contains 3% to 7% by weight of fluorine estimated in elemental form. When operated at higher pressure the catalyst preferably contains a lower proportion of fluorine, for example, 1% to 5% by weight, estimated in elemental form.

The catalyst may be reactivated after prolonged use by means of air or air/nitrogen mixtures or other conventional procedures which can be achieved at any suitable temperature up to at least 650° C. without loss of activity, although lower maximum temperatures are preferred to eliminate fluorine loss.

The reaction may be carried out either in the presence or absence of molecular hydrogen. It has been found that the presence of hydrogen, preferably at superatmospheric pressure, reduces carbon formation on the catalyst.

Preferably the temperature of the reaction lies in the range 500–650° C. Atmospheric or superatmospheric pressure may be employed.

The invention is illustrated but in no way limited with reference to the following examples.

EXAMPLE 1

1,520 grams of aluminium isopropoxide were powdered and hydrolysed by shaking with 3,500 ml. distilled water. The mixture was allowed to stand for 40 minutes and was then centrifuged at 1000 r.p.m. for 14 minutes. The supernatant liquor was poured off, the remaining alumina gel peptized with 50 ml. of glacial acetic acid and allowed to stand for 17 hours. The peptized gel was divided into four portions. To one quarter, by weight, of the peptized gel was added 13.78 grams of 40% hydrofluoric acid and the mixture thoroughly stirred. The gel was then dried at 110° C. for 3½ hours and at 120°–140° C. for 16½ hours. The dried catalyst was then ignited at 190°–200° C. for 3½ hours and at 500°–550° C. for 3 hours. The catalyst was crushed and graded to give 4–8 mesh granules. The catalyst contained about 5 percent wt. of fluorine (estimated in elemental form).

EXAMPLE 2

A catalyst, prepared by the method described in Example 1 was employed for the conversion of the following alkyl thiophenes.

The alkyl thiophenes were passed at atmospheric pressure and in vapour phase in a current of hydrogen, over the catalyst under the conditions and with the results shown in the following table.

Table

| Feedstock | 2-Methyl thiophene | 3-Methyl thiophene | 2:5-Dimethyl thiophene | 2:3:5-Trimethylthiophene |
|---|---|---|---|---|
| Temperature, °C | 556 | 550 | 549 | 553 |
| Space velocity, v./v./hr | 0.70 | 0.66 | 0.56 | 0.50 |
| H$_2$:Hydrocarbon mol ratio | 3.4 | 3.4 | 4.6 | 4.5 |
| Run Duration, hr | ½ | ½ | ½ | ½ |
| Total liquid yield, Percent wt | 46.3 | 44.8 | 32.0 | 26.2 |
| Product Composition: | | | | |
| Benzene, Percent wt | 3.7 | 1.5 | 8.8 | 13.8 |
| Toluene, Percent wt | 5.4 | 4.7 | 19.6 | 41.5 |
| Thiophene, Percent wt | 36.9 | 40.4 | 16.4 | 8.8 |
| Methylthiophenes, Percent wt | 45.5 | 45.6 | 30.8 | 11.9 |
| Dimethylthiophenes, Percent wt | 8.5 | 7.8 | 24.4 | 24.0 |

We claim:

1. A process for the treatment of an extract obtained by solvent extraction of a distillate fraction of petroleum origin, said extract containing a major proportion of aromatic hydrocarbons and a minor proportion of alkyl thiophenes, wherein said extract is passed at elevated temperature in contact with a catalyst consisting essentially of alumina in catalytically active form and containing fluorine, said catalyst being produced by impregnation of alumina with hydrofluoric acid in aqueous solution, said extract being passed over said catalyst under conditions of temperature, pressure and space velocity such that at least one alkyl thiophene is converted to at least one thiophene of different boiling point and, thereafter, the treated extract is distilled to recover at least one fraction enriched in aromatic hydrocarbons and at least one fraction enriched in thiophenes.

2. A process as specified in claim 1 in which the extract is obtained by solvent extraction of a distillate fraction of petroleum origin, followed by sulphuric acid washing with recovery of an acid tar, treatment of the tar with an aqueous medium to form a non-aqueous phase, whereby said non-aqueous phase constitutes the extract containing a major proportion of aromatic hydrocarbons and a minor proportion of alkyl thiophenes.

3. A process as specified in claim 2 in which the extract has a boiling range not greater than 20° C.

4. A process for the treatment of an extract obtained by solvent extraction of a distillate fraction of petroleum origin, said extract containing a major proportion of aromatic hydrocarbons and a minor proportion of alkyl thiophenes, wherein said extract is passed at elevated temperature in contact with a catalyst consisting essentially of alumina in catalytically active form and containing fluorine, said catalyst being produced by impregnation of alumina with hydrofluoric acid in aqueous solution, said extract being passed over said catalyst under conditions of temperature, pressure and space velocity such that at least one alkyl thiophene is converted to at least one aromatic hydrocarbon.

5. A process as specified in claim 4 in which the treated extract is distilled to recover at least one fraction enriched in aromatic hydrocarbons and at least one fraction enriched in thiophenes.

6. A process as specified in claim 5 in which the extract has a boiling range not greater than 20° C.

7. A process as specified in claim 4 in which the extract is obtained by solvent extraction of a distillate fraction of petroleum origin, followed by sulphuric acid washing with recovery of an acid tar, treatment of the tar with an aqueous medium to form a non-aqueous phase, whereby said non-aqueous phase constitutes the extract containing a major proportion of aromatic hydrocarbons and a minor proportion of alkyl thiophenes.

8. A process as specified in claim 4 in which the extract is treated in vapour phase.

9. A process as specified in claim 8 in which the reaction temperature lies in the range 500–650° C.

10. A process as specified in claim 4 in which the catalyst contains 3–7% by weight of fluorine, estimated in elemental form and wherein the reaction is carried out at atmospheric pressure:

11. A process as specified in claim 4 in which the catalyst contains 1–5% by weight of fluorine, estimated in elemental form and wherein the reaction is carried out at superatmospheric pressure.

12. A process as specified in claim 4 in which the reaction is carried out in the presence of hydrogen.

References Cited in the file of this patent

UNITED STATES PATENTS

| 2,456,435 | Matuszak | Dec. 14, 1948 |
| 2,531,280 | Kreuz | Nov. 21, 1950 |
| 2,563,087 | Vesely | Aug. 7, 1951 |
| 2,707,699 | Johnson et al. | May 3, 1955 |

OTHER REFERENCES

Knunyants: Chemical Abstracts, volume 40 (1946), column 5073.